(12) United States Patent
Grasso (10) Patent No.: US 10,732,436 B2
(45) Date of Patent: Aug. 4, 2020

(54) COLOURED GLASS LENS FOR EYEGLASSES AND METHOD FOR MAKING IT

(71) Applicant: LUXOTTICA S.R.L., Agordo (IT)

(72) Inventor: Omar Grasso, Chivasso (IT)

(73) Assignee: LUXOTTICA S.R.L., Agordo (IT)

(*) Notice: Subject to any disclaimer, the term of this patent is extended or adjusted under 35 U.S.C. 154(b) by 0 days.

(21) Appl. No.: 14/419,596

(22) PCT Filed: Jul. 17, 2013

(86) PCT No.: PCT/IB2013/055862
§ 371 (c)(1),
(2) Date: Feb. 4, 2015

(87) PCT Pub. No.: WO2014/024065
PCT Pub. Date: Feb. 13, 2014

(65) Prior Publication Data
US 2015/0219931 A1    Aug. 6, 2015

(30) Foreign Application Priority Data

Aug. 7, 2012 (IT) .............................. BO2012A0437

(51) Int. Cl.
G02C 7/10 (2006.01)
G02C 7/12 (2006.01)
(Continued)

(52) U.S. Cl.
CPC ........ *G02C 7/108* (2013.01); *B29D 11/00009* (2013.01); *B29D 11/00865* (2013.01); *B32B 37/1284* (2013.01); *B32B 37/18* (2013.01); *G02C 7/10* (2013.01); *G02C 7/102* (2013.01); *G02C 7/105* (2013.01); *G02C 7/12* (2013.01); *B29D 11/00644* (2013.01);
(Continued)

(58) Field of Classification Search
CPC ........ G02C 7/102; G02C 7/101; G02C 7/104; G02C 7/105; G02C 7/108; G02C 7/10; G02C 7/107
See application file for complete search history.

(56) References Cited

U.S. PATENT DOCUMENTS 6,793,339 B1    9/2004   Yip
8,210,678 B1    7/2012   Farwig
(Continued)

FOREIGN PATENT DOCUMENTS

EP    1457808 A1    9/2004
WO    9722894 A1    6/1997

OTHER PUBLICATIONS

International Search Report for corresponding application PCT/IB2013/055862 filed Jul. 17, 2013; dated Oct. 21, 2013.

*Primary Examiner* — Darryl J Collins
*Assistant Examiner* — Journey F Sumlar
(74) *Attorney, Agent, or Firm* — Cantor Colburn LLP (57) ABSTRACT

A colored glass lens for eyeglasses and a method for making such lens, where the lens includes a front glass wafer and a rear glass wafer having a convex surface connected to a concave surface of the front wafer, at least one of either the convex surface of the rear wafer or the concave surface of the front wafer being colored, and a layer of glue interposed between the surfaces for bonding the front and rear wafers to each other.

13 Claims, 3 Drawing Sheets

(51) Int. Cl.
  *B29D 11/00* (2006.01)
  *B32B 37/12* (2006.01)
  *B32B 37/18* (2006.01)

(52) U.S. Cl.
  CPC . *B29D 11/00653* (2013.01); *B32B 2307/4026* (2013.01); *B32B 2307/412* (2013.01); *B32B 2551/00* (2013.01); *G02C 2202/16* (2013.01)

(56) References Cited

U.S. PATENT DOCUMENTS

| | | | |
|---|---|---|---|
| 2002/0126256 A1 | 9/2002 | Larson | |
| 2005/0109458 A1* | 5/2005 | D'Herbecourt | B32B 7/12 |
| | | | 156/310 |
| 2011/0075096 A1* | 3/2011 | Ishak | G02B 5/23 |
| | | | 351/159.65 |
| 2011/0255051 A1 | 10/2011 | McCabe | |
| 2012/0298491 A1* | 11/2012 | Ozias | G06F 1/1662 |
| | | | 200/314 |

\* cited by examiner

COLOURED GLASS LENS FOR EYEGLASSES AND METHOD FOR MAKING IT

TECHNICAL FIELD

This invention relates to a coloured glass lens for eyeglasses and to a method for making the lens.

BACKGROUND ART

The invention addresses the sector of lenses for eyeglasses.

More specifically, the invention relates to the technical field of coloured glass lenses.

In effect, in the eyeglasses sector, the need is felt for coloured glass lenses and, in some cases, colour gradient lenses, that is to say, lenses where the colour is distributed non-uniformly over the surface of the lens.

As regards the colouring of plastic wafers, methods which involve dipping the plastic wafer in a dye are known in the prior art, for example from patent document EP1457808.

Examples of applying a method of this kind to plastic lenses are also described in patent documents ITB020070721 and ITB020070722 in the name of the same Applicant as this invention.

These methods are not used for colouring lenses made of glass, however, because a glass lens coloured with a method of this kind would tend to deteriorate rapidly and to lose its colour properties.

Glass lenses are therefore coloured using a different technique, known as physical vapour deposition (PVD), usually accomplished by the application of plasma.

Examples of lenses coloured using the PVD technique are described in patent documents U.S. Pat. No. 6,793,339B1, WO97/22894A1 and US2002/126256A1.

Other examples of multi-layer lenses for eyeglasses are described in patent documents U.S. Pat. No. 8,210,678B1 and US2011/255051A1.

This method, too, however (that is, colouring glass lenses by PVD) has some (at least two) disadvantages.

A first disadvantage is the limited range of colours that can be applied to the lens.

Moreover, the PVD method involves considerable costs, due to the large amount of waste material and to the equipment needed for the process.

DISCLOSURE OF THE INVENTION

This invention has for an aim to provide a coloured glass lens for eyeglasses and a method for making the lens which overcome the above mentioned disadvantages of the prior art.

More specifically, the aim of this invention is to provide a coloured glass lens for eyeglasses (and a method for making the lens) that is inexpensive to make and durable in terms of the resistance of the colour to fading.

Another aim of the invention is to achieve the above aims by providing a coloured and graded lens.

Another aim of the invention is to achieve the above aims by providing a lens which is also photocromic and/or polarized and/or has enhanced colour contrast.

Another aim of the invention is to provide a glass lens for eyeglasses (and a method for making the lens) which protects the wearer from the sun's rays and which is at once aesthetically pleasing both for a person looking at the eyeglasses from the outside and for the person wearing them.

These aims are fully achieved by the lens and method according to the invention as characterized in the appended claims.

More specifically, the lens according to the invention is a coloured glass lens for eyeglasses, comprising a front glass wafer and a rear glass wafer having a convex surface connected to a concave surface of the front wafer (the term "wafer" basically denoting a layer of the laminate lens structure).

The lens thus comprises two glass wafers, each of which has a convex surface and a concave surface.

These wafers are configured in such a way as to be coupled to each other to form the lens, and so one of the wafers is positioned at the front (and is thus called the front wafer) and the other is positioned at the back (and is thus called the rear wafer).

The term "front wafer" denotes the wafer which, when the lens is mounted in a pair of eyeglasses and worn by a user, is at a distal position relative to the user's eye. Similarly, the term "rear wafer" denotes the wafer which, when the lens is mounted in a pair of eyeglasses and worn by a user, is at a proximal position relative to the user's eye.

Thus, a ray of light which goes through the lens and reaches the eye of the user wearing the eyeglasses passes first through the front wafer and then through the rear wafer.

According to the invention, at least one of either the convex surface of the rear wafer or the concave surface of the front wafer is coloured; that is to say, the convex surface of the rear wafer is coloured or the concave surface of the front wafer is coloured.

More specifically, the at least one surface is coloured by forming a coloured coating. The coloured coating is made by applying a cross-linked coating and then colouring it.

The lens also comprises a layer of glue, interposed between those surfaces (the convex surface of the rear wafer and the concave surface of the front wafer) in order to bond the front and rear surfaces to each other.

The front glass wafer and/or the layer of glue defines a filter as a screen against UV rays.

This lens configuration makes it possible to colour one of the two glass wafers (the front one or the rear one) using a method which involves applying a coat to the surface of the glass wafer (for example using the dipping method or the spinning method) and dipping the coated lens in a solution/dispersion containing colouring substances.

It should be noted also that the convex surface of the rear wafer and the concave surface of the front wafer might both be coloured.

Preferably, the at least one coloured surface, between either the convex surface of the rear wafer or the concave surface of the front wafer, is colour graded (or double colour graded).

More specifically, it should be noted that colouring the glass wafer preferably comprises the following steps.

First there is a step of lacquering which comprises applying a liquid precursor to form a coat (also known as lacquer) on the substrate constituted by one of the glass wafers. The lacquer is applied for example using any of various methods, implementing techniques known as spinning, dipping, flow coating or spraying. The lacquer applied uniformly in this way is then cross-linked using an external agent such as, for example, UV radiation, heat, or both.

Next, there is a step of applying a colour or colour gradient proper by dipping the lacquered glass wafer in a colouring bath. Thus, the lacquer which has already been cross-linked is coloured, for example by controlled dipping in a water-based, high-temperature colouring bath in which predetermined pigments have been dissolved. During this process, the pigments penetrate the lacquer and colour it. By selecting and controlling the way the wafer is dipped in the colouring bath, it is possible to obtain a solid, or uniform, colour (by total dipping of the lacquered glass wafer), a colour gradient (by gradual, controlled dipping) or double gradient (colour grading process applied in one direction and then in the opposite direction).

Further details regarding colour gradient can be found in patent documents ITB020070721 and ITB020070722 in the name of the same Applicant as this invention and incorporated herein by reference with regard to such colouring method.

Preferably, the front glass wafer is photochromic.

If the concave surface of the front wafer is coloured, the front glass wafer preferably constitutes a UV screen (in which case it is not essential for the layer of glue to also constitute a UV filter).

This provides protection for the coloured surface.

If (only) the convex surface of the rear wafer is coloured, on the other hand, the front wafer preferably does not have a UV screen. In that case, the coloured surface is protected by the layer of glue (which itself constitutes a UV filter), which is located in front of the coloured surface.

The invention also provides a method for making a coloured glass lens for eyeglasses.

The method comprises a step of connecting a front glass wafer and a rear glass wafer at an interface between a convex surface of the rear wafer and a concave surface of the front wafer.

According to the invention, the method also comprises the following steps:
  colouring at least one of either the convex surface of the rear wafer or the concave surface of the front wafer;
  depositing a predetermined quantity of glue (if necessary constituting a UV screen) at the interface;
  bonding the rear wafer and the front wafer to each other.

It should be noted that the colouring step is accomplished by contact of the surface of the glass wafer to be coloured, previously lacquered (for example using the method known as dipping or the method known as spinning) with a colouring liquid.

Preferably, the step of colouring the lens comprises colour grading the lens.

Also, preferably, the bond between the rear wafer and the front wafer is subjected to a step of cross-linking the glue.

The cross-linking step may be performed, for example, by UV irradiation or exposure to heat, or by reaction with humidity (alternatively or in combination) of the assembly consisting of the front and rear wafers with the layer of glue interposed between them.

Preferably, the glue is applied to the concave surface of the front glass wafer.

The invention also provides a pair of eyeglasses comprising a frame, two temples and two lenses, where the lenses have the features described in this patent document.

The invention also provides a method for making a pair of eyeglasses comprising the steps of preparing and assembling a frame, two temples and two lenses, where the lenses have the features described in this patent document.

Thus, it should be noted that in the lens according to the invention, preferably the coloured coating of the at least one surface (either the convex surface of the rear layer or the concave surface of the front layer) comprises a pigmented lacquer (or layer of pigmented lacquer).

More specifically, the coloured coating comprises a layer of lacquer impregnated with pigment.

It should be noted that impregnation (of the lacquer) with the pigment may be performed after and/or before depositing and drying the lacquer.

The optical (colour) properties of the coloured coating are symmetrical; that is to say, the perception of the colour is the same both from the point of view of a external observer of the lens and from that of the wearer of the lens.

Hence, the colour of the coloured coating is perceived not only by someone looking at the eyeglasses from outside but also by the person wearing the eyeglasses, thus giving the possibility of selecting the colour based on the aesthetic appeal of the wearer and visual functionality.

As regards making the layer of pigmented lacquer, attention is further drawn to the following.

Preferably, the step of depositing the layer of lacquer in turn comprises the following sub-steps:
  applying to the surface of the wafer (that is, the at least one surface between either the convex surface of the rear layer or the concave surface of the front layer) a lacquering liquid containing a precursor of the lacquer;
  forming a layer of lacquer on that surface only;
  drying the layer of lacquer (to produce cross-linking, for example by heating).

As to the pigments used for colouring the lacquer by dipping, they are preferably of the type used in the textile industry to dye textile fibres in general, for example, nylon and/or cellulose acetates and triacetates.

Preferably, these pigments are insoluble in water. The pigments used are preferably of the non-hydrosoluble type. Preferably, these pigments are dispersion pigments.

Alternatively, or in addition, some pigments which are chemically similar to the lacquering liquid are previously dissolved therein in order to produce colour without reducing transparency. After being deposited and dried, the lacquer already has a uniform colour and may be further coloured by dipping, for example to add graded or double-graded colouring.

In both cases, the pigments give the lens certain properties of absorption of visible light (colouring, increased contrast) and/or near-infrared light (filtration of IR radiation).

BRIEF DESCRIPTION OF THE DRAWINGS

This and other features of the invention will become more apparent from the following detailed description of a preferred, non-limiting example embodiment of it, with reference to the accompanying drawings, in which.

DETAILED DESCRIPTION OF PREFERRED EMBODIMENTS OF THE INVENTION

The numeral 1 in the drawings denotes a glass lens for eyeglasses according to the invention.

The lens 1 is a coloured lens. Preferably, the lens 1 is a (coloured and) colour gradient lens.

The lens 1 comprises a first glass wafer 2 (hereinafter referred to as front wafer) and a second glass wafer 3 (hereinafter referred to as rear wafer).

The glass used to make these wafers is preferably selected from one of the following types:
crown glass;
glass able to provide UV protection;
aluminosilicate, or alkali aluminosilicate, or borosilicate;
glass containing rare earth elements (for example, neodymium); this glass can provide enhanced colour contrast;
photochromic glass, that is, glass containing photochromic species (for example, silver halides) capable of producing colour and darkening the colour when exposed to activating radiation (UV or visible);
glass capable of filtering infrared radiation, particularly in the range between 780 and 2000 nanometres.

It should be noted that the glass of at least one of the wafers 2 and 3 might also be mass-coloured.

It should also be noted that the glass of the wafers 2 and 3 is preferably chemically tempered.

Preferably, the UV protection is provided by UV filters which comprise UV absorbers. These absorbers may belong, for example, to the families of benzophenones, benzotriazoles, or derivatives thereof.

Thus, the lens 1 comprises a front glass wafer 2 having a convex surface 2A and a concave surface 2B.

The lens 1 also comprises a rear glass wafer 3 having a convex surface 3A and a concave surface 3B.

The convex surface 3A of the rear glass wafer 3 is face to face with (or contiguous with, or adjacent to) the concave surface 2B of the front glass wafer 2.

The convex surface 3A of the rear glass wafer 3 is bonded to the concave surface 2B of the front glass wafer 2 by a layer of glue 4 interposed between them.

The layer of glue 4 preferably defines UV screen (that is, a UV filter).

The layer of glue 4 is interposed between the front wafer 2 and the rear wafer 3 in order to bond them to each other.

At least one of either the convex surface 3A of the rear wafer 3 or the concave surface 2B of the front wafer 2 is coloured.

The numeral 5 in the drawings denotes a coloured layer defined by at least one of the surfaces of at least one of the wafers 2, 3. The coloured layer 5 is a surface layer (or portion) of one of the wafers 2, 3.

Figure 1:
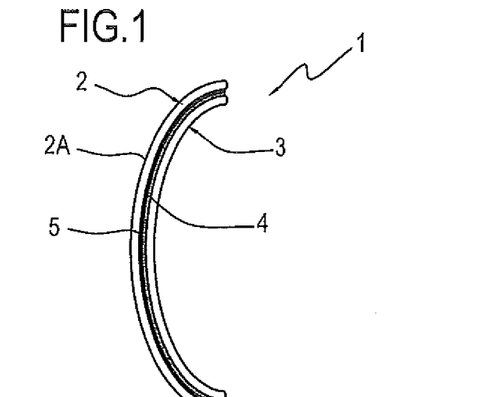
FIG. 1 is a cross section of a first embodiment of the lens of the invention.
Figure 7:
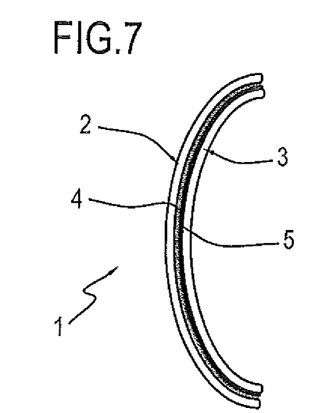
FIG. 7 is a cross section of a second embodiment of the lens of the invention.

FIG. 1 illustrates a first embodiment, where the concave surface 2B of the front wafer 2 is coloured. FIG. 7 illustrates a second embodiment, where the convex surface 3A of the rear wafer 3 is coloured.

Preferably, the at least one coloured surface is colour graded.

Preferably, the front glass wafer 2 is photochromic, according to a technology of per se known type.

For example, the composition of the glass mass of the front wafer 2 might comprise silver halides or other photochromic species. Alternatively, or in combination, a photochromic coating (for example containing spirooxazines or other organic photochromic species) might be applied to the front wafer 2.

Preferably, the glue is a modified urethane, polyurethane, acrylic, epoxy or silicone glue. Preferably, it is a glue which can be cross-linked by UV irradiation, heat, humidity or a combination of these agents.

Preferably, the lens 1 does not have coloured polymeric layers. In particular, the lens 1 does not have glued coloured polymeric layers interposed between the front glass wafer 2 and the rear glass wafer 3.

In light of this, it should be noted that in one possible embodiment, a photochromic or dichroic polymeric film with polarizing properties (for example, polyvinyl alcohol) might be interposed between the two glass wafers.

In the first embodiment, where the concave surface 2B of the front wafer 2 is coloured, the front wafer 2 preferably has a UV filter.

In the second embodiment, where the convex surface 3A of the rear wafer 3 is coloured, the front wafer 2 does not have any UV filter (and, instead, the layer of glue 4 defines a UV filter).

As regards the method for making the lens 1 according to the invention, attention is drawn to the following.

The method comprises the following steps:
preparing the front glass wafer 2 and the rear glass wafer 3;
colouring the concave surface 2B of the front wafer 2 or the convex surface 3A of the rear wafer 3;
depositing a predetermined quantity of glue to form the layer of glue 4 (if necessary constituting a UV screen) at an interface between the concave surface 2B of the front wafer 2 and the convex surface 3A of the rear wafer 3;
bonding the rear wafer 3 and the front wafer 2 to each other.

Preferably, the colouring step comprises applying a coat (by lacquering) to the surface of the glass wafer and dipping the coated (lacquered) surface to be coloured in a solution/dispersion containing colouring substances.

The coating (lacquering) is done using either of two techniques, called dipping or spinning, (described in more detail below).

Preferably, the colouring step comprises providing (at least) that surface with a colour gradient (or double colour gradient).

The colouring step preferably comprises a preliminary step of lacquering the glass wafer 2 or 3 to be coloured.

The next step is colouring proper (and preferably colour grading) the wafer 2 or 3 to be coloured, or at least the surface of that wafer.

A glass lens is thus obtained which is coloured, or colour graded, or double-colour graded on both surfaces (if lacquering has been effected by "dipping") or on one surface only (if lacquering has been effected by "spinning" or using the equivalent techniques known as "flow-coating" or "spraying").

To facilitate bonding between the rear glass wafer 3 and the front glass wafer 2 of the lens 1, the glue is subjected to a step of cross-linking. The cross-linking step comprises, for example, UV irradiation or application of heat or reaction with humidity, applied to the assembly consisting of the front and rear wafers 2 and 3 and the layer of glue 4 interposed between them, in order to cause the glue to become cross-linked.

In a first embodiment of the method according to the invention, the colouring is applied to the concave surface 2B of the front wafer 2. In this case, the front glass wafer 2 defines a UV filter.

In a second embodiment of the method according to the invention, the colouring is applied to the convex surface 3A of the rear wafer 3. In this case, the front glass wafer 2 is preferably without UV filters.

The first embodiment of the invention is described in detail below with reference to FIGS. 2 to 5, in succession.

Figure 2:
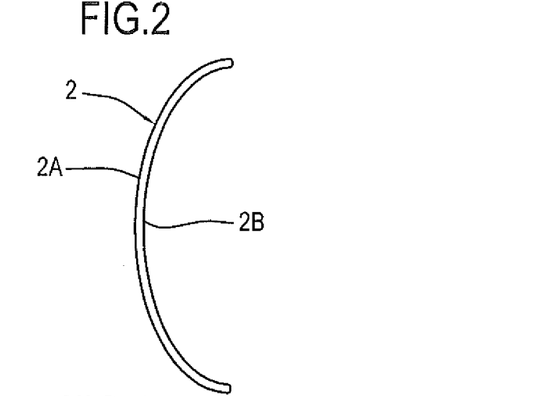
FIG. 2 shows the front glass wafer of the lens of FIG. 1.

The first step is to lacquer the front wafer 2 (provided with UV filter).

Figure 3:
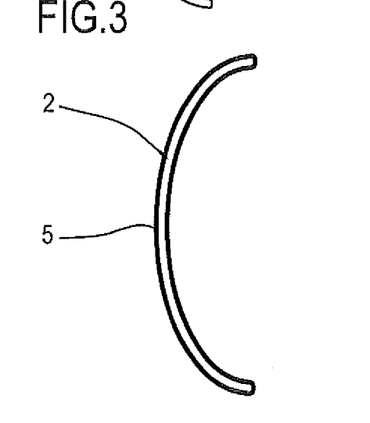
FIG. 3 illustrates the front glass wafer of FIG. 2, where the surface of the wafer is coloured.

The front wafer 2 is coloured after being lacquered, for example using the "dipping" method (in this case, both the convex surface 2A and the concave surface 2B of the front wafer 2 are coloured), or using the "spinning" method (in this case, only the concave surface 2B of the front wafer 2 is coloured).

A front glass wafer 2 is thus obtained which is coloured (preferably colour graded) on both surfaces or on one surface only.

Figure 4:
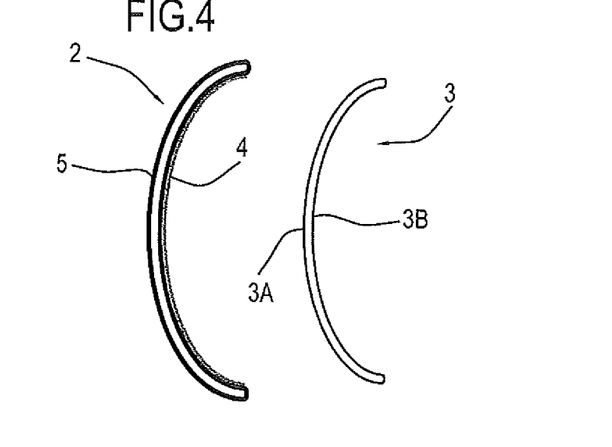
FIG. 4 shows the rear glass wafer of the lens of FIG. 1 and the front glass wafer of FIG. 3, with its concave surface in contact with the glue.

Next, a predetermined quantity of glue is applied to form the layer of glue 4 (if necessary defining a UV filter) to the concave surface 2B of the front wafer 2.

The rear glass wafer 3 (which is preferably transparent, that is, not colour-coated but which might be mass-coloured in the case of contrast enhancement), preferably without UV filter, is then assembled to the front wafer 2.

Figure 5:
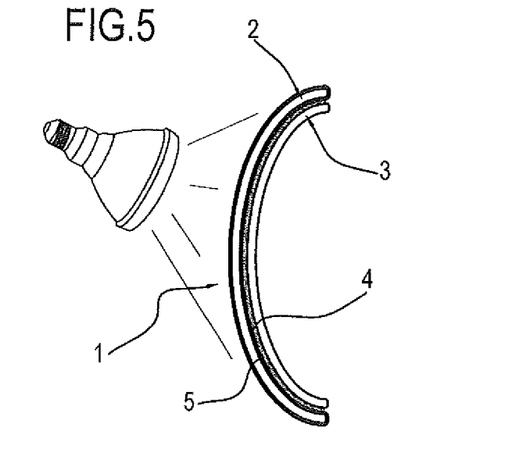
FIG. 5 shows the front and rear glass layers of FIG. 4 bonded to each other and subjected to a reticulating step.
Figure 6:
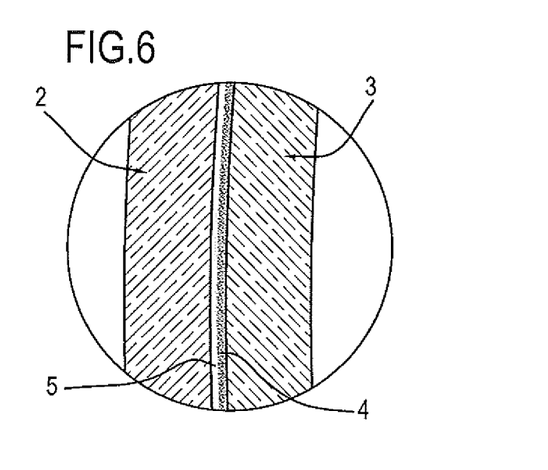
FIG. 6 illustrates an enlarged detail of the lens of FIG. 1.

This sandwich, consisting of the two glass wafers 2 and 3 with the layer of glue 4 interposed between them, is then subjected to a step of cross-linking the layer of glue 4.

Thus, in the assembly (sandwich) consisting of the two glass wafers 2 and 3 with the layer of glue 4 interposed between them, the coloured surface 2B is a surface inside the lens 1 and is therefore protected by the rear glass wafer 3.

If the colouring has been applied to the entire surface of the front wafer 2, there is now a step of removing the colour from (that is, colour grading) the convex surface 2A of the front wafer 2 (on the outside of the lens 1).

This step of removing the colour is not necessary if the colouring step (and more specifically, the preliminary lacquering step, that is, the application of the coating) is performed using the spinning, flow-coating or spraying methods.

The second embodiment of the invention is described in detail below with reference to FIGS. 8 to 11, in succession.

Figure 8:
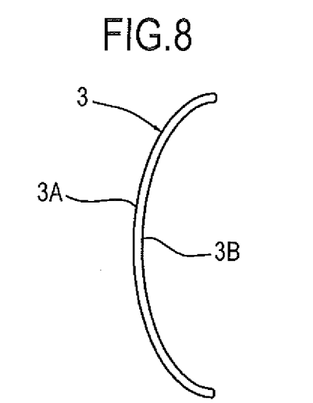
FIG. 8 shows the rear glass wafer of the lens of FIG. 7.

The first step is to lacquer the rear glass wafer 3.

Figure 9:
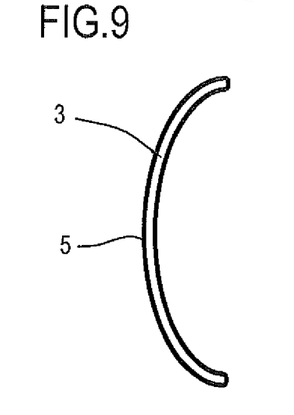
FIG. 9 illustrates the rear glass wafer of FIG. 8, where the surface of the wafer is coloured.

The rear wafer 3 is coloured after being lacquered, for example using the "dipping" method (in this case, both the convex surface 3A and the concave surface 3B of the rear wafer 3 are coloured), or using the "spinning" method (in this case, only the convex surface 3A of the rear wafer 3 is coloured).

A rear glass wafer 3 is thus obtained which is coloured (preferably colour graded) on both surfaces or on one surface only.

Figure 10:
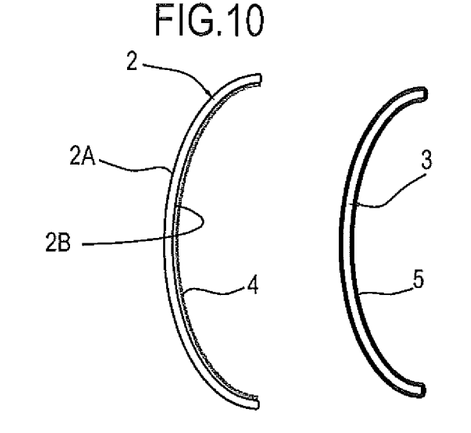
FIG. 10 shows the rear glass wafer of FIG. 9 and the front glass wafer of the lens of FIG. 7, with its concave surface in contact with the glue.

Next, a predetermined quantity of glue is applied to form the layer of glue 4 (if necessary defining a UV filter) to the concave surface 2B of the front wafer 2.

The coloured (or colour graded) rear glass wafer 3 is then assembled to the front wafer 2.

Figure 11:
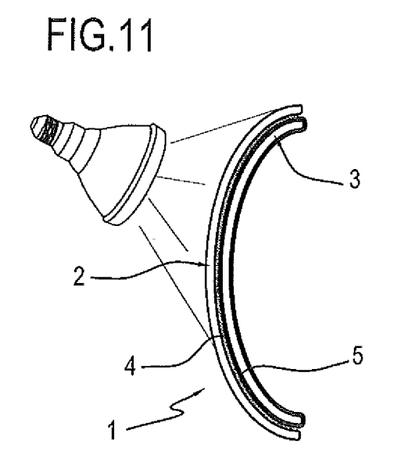
FIG. 11 shows the front and rear glass wafers of FIG. 10 bonded to each other and subjected to cross-linking.
Figure 12:
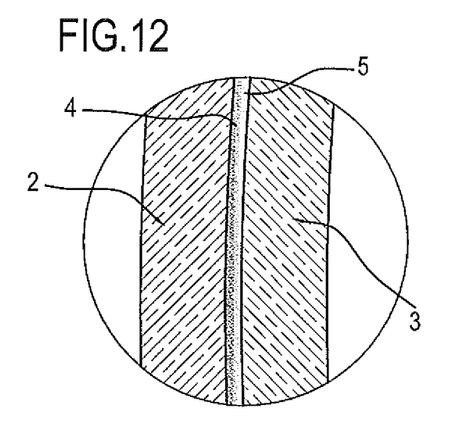
FIG. 12 illustrates an enlarged detail of the lens of FIG. 7.

This sandwich, consisting of the two glass wafers 2 and 3 with the layer of glue 4 interposed between them, is then subjected to a step of cross-linking the layer of glue 4.

Thus, in the assembly (sandwich) consisting of the two glass wafers 2 and 3 with the layer of glue 4 interposed between them, the coloured surface 3A is a surface inside the lens 1 and is therefore protected by the front glass wafer 2.

If the colouring has been applied to the entire surface of the rear wafer 3, there is now a step of removing the colour from (that is, colour grading) the concave surface 3B of the rear wafer 3 (on the outside of the lens 1).

This step of removing the colour is not necessary if the colouring step is performed using methods which can be applied directly on a single face, for example the methods known as spinning, flow-coating or spraying.

At least one of the wafers 2 and 3 might be polarized (by a polarized coating), or the lens 1 might comprise a polarized film interposed between the glass wafers 2 and 3 to obtain a lens 1 which is polarized and at once coloured or colour graded or double colour graded.

To give the lens 1 the polarizing property, the following two approaches can be adopted, individually or in combination.

According to the first approach, a polarized dichroic coating is applied to the surface without colouring, which may be either the convex surface 3A of the rear wafer 3 (first variant embodiment) or the concave surface 2B of the front wafer 2 (second variant embodiment)

In the second approach, a polarized film is interposed between the concave surface 2B of the front wafer 2 or the convex surface 3A of the rear wafer 3.

The polarized film—made for example of poly(vinyl alcohol)—is preferably a precurved, solid polymeric film which needs glue on both sides so as to adhere to both the concave surface 2B of the front wafer 2 or the convex surface 3A of the rear wafer 3. Thus, in this configuration, the lens comprises two layers of glue.

Preferably, in this case, a predetermined quantity of glue is applied to the concave surface 2B of the front wafer 2 and on a concave surface of the polarized film (which is curved and therefore forms a concave surface and a convex surface).

To give the lens 1 the photochromic property, the following two approaches can be adopted, individually or in combination (although other approaches are possible, such as, for example, the use of glass with silver halides added to it, as mentioned above).

According to the first approach, a photochromic coating is applied to the surface without the coloured coating 5, which may be either the convex surface 3A of the rear wafer 3 (first variant embodiment) or the concave surface 2B of the front wafer 2 (second variant embodiment).

In the second approach, a photochromic film is interposed between the concave surface 2B of the front wafer 2 or the convex surface 3A of the rear wafer 3.

The photochromic film needs glue on both sides so as to adhere to both the concave surface 2B of the front wafer 2 or the convex surface 3A of the rear wafer 3. Thus, in this configuration, the lens comprises two layers of glue (as described in connection with the polarized film).

Figure 13:
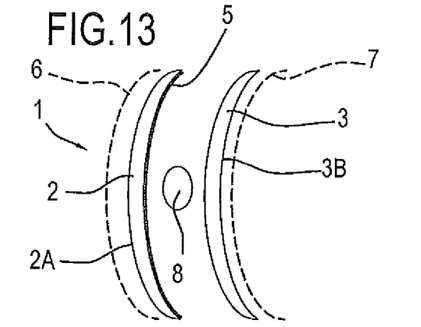
FIG. 13 schematically illustrates the lens of FIG. 1 in an exploded view.
Figure 17:
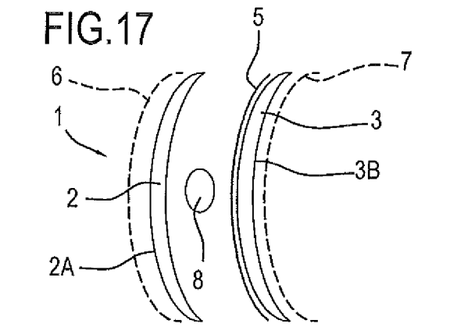
FIG. 17 schematically illustrates the lens of FIG. 7 in an exploded view.

The lens 1 according to the invention is illustrated schematically in FIG. 13 (in the first embodiment of it, where the concave surface 2B of the front wafer 2 is coloured) and in FIG. 17 (in the second embodiment of it, where the convex surface 3A of the rear wafer 3 is coloured).

In these figures, the numeral 6 denotes a front coating of the lens 1, created by a mirror treatment and/or a hydrophobic treatment of the lens 1. The treatment involves the convex surface 2A of the front glass wafer 2.

Thus, the front coating 6 is applied to the convex surface 2A of the front glass wafer 2.

Thus, the lens 1 preferably comprises the front coating 6, which has reflective and/or hydrophobic properties.

Further, the lens 1 preferably comprises a rear coating 7, which has anti-glare and/or hydrophobic properties.

The rear coating 7 is created by an anti-glare treatment and/or a hydrophobic treatment of the lens 1. The treatment involves the concave surface 3B of the rear glass wafer 3.

Thus, the rear coating 7 is applied to the concave surface 3B of the rear glass wafer 3.

The front and rear coatings 6, 7 are preferably applied to the lens 1 irrespective of whether colouring is applied according to the first embodiment or the second.

Further, it should be noted that the numeral 8 in FIGS. 13-20 denotes a quantity of glue which is schematically represented in order to indicate the position where the layer of glue 4 is when the lens 1 is assembled.

It should be noted that the coloured layer 5 is a coating made (on the concave surface 2B of the front glass wafer 2 or on the convex surface 3A of the rear glass wafer 3) by lacquering and then impregnated with colour.

Thus, the coloured layer 5 is a coloured or colour graded coating. The coating is an internal coating, in the sense that it is interposed between the glass wafers 2, 3, and is not in contact with the air.

Preferably, the lens 1 comprises an additional internal coating 9 having polarizing and/or photochromic properties.

The additional internal coating 9 is applied to the concave surface 2B of the front glass wafer 2 or to the convex surface 3A of the rear glass wafer 3 which is without the coloured coating, that is, without the coloured layer 5.

Thus, in the first embodiment, where the concave surface 2B of the front wafer 2 is coloured, the additional internal coating 9 is applied to the convex surface 3A of the rear glass wafer 3, whereas in the second embodiment, where the convex surface 3A of the rear wafer 3 is coloured, the additional internal coating 9 is applied to the concave surface 2B of the front wafer 2.

Preferably, the lens 1 also comprises a polarized or photochromic film 10. The polarized or photochromic 10 film is precurved.

Preferably (but not necessarily), the polarized or photochromic film 10 is used when there is no additional internal coating 9.

The polarized or photochromic film 10 consists of a polymeric substrate especially treated or with suitable additives; that is to say, the polarized or photochromic film 10 is made from a thin polymeric film which is treated (according to a method of per se known type) to obtain the desired polarizing or photochromic property.

The polarized or photochromic film 10 is located inside the lens 1, between two layers of glue 4. In effect, the polarized or photochromic film 10 is not a coating but a separate film which must be bonded by adhesive means to the concave surface 2B of the front glass wafer 2 (where the concave surface 2B may or may not be coated with the coloured layer 5 or the additional internal coating 9) and to the convex surface 3A of the rear glass wafer 3 (where the convex surface 3A may or may not be coated with the coloured layer 5 or the additional internal coating 9).

Thus (in a possible embodiment), the lens 1 might comprise the polarized or photochromic film 10 interposed between two layers of glue 4.

It should be noted that if the polarized or photochromic film 10 is not present, the lens 1 is preferably without glued polymeric layers (or films).

Figure 14:
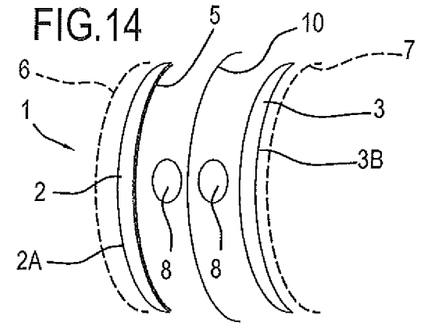
FIGS. 14-16 illustrate variant embodiments of the lens of FIG. 13.
Figure 15:
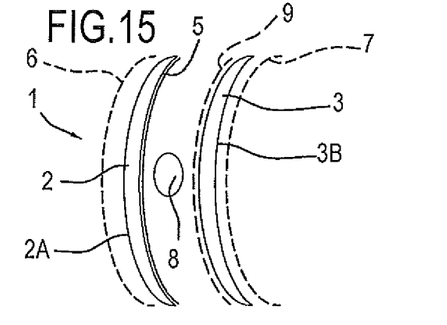
Figure 16:
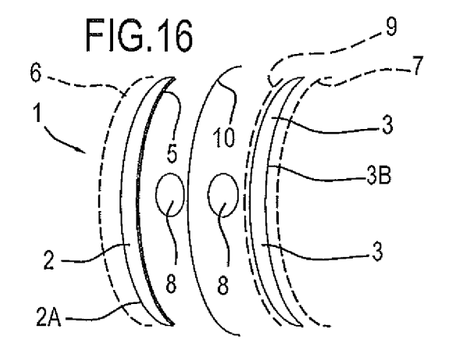
Figure 18:
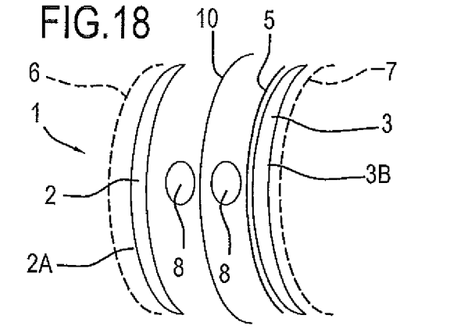
FIGS. 18-20 illustrate variant embodiments of the lens of FIG. 17.
Figure 19:
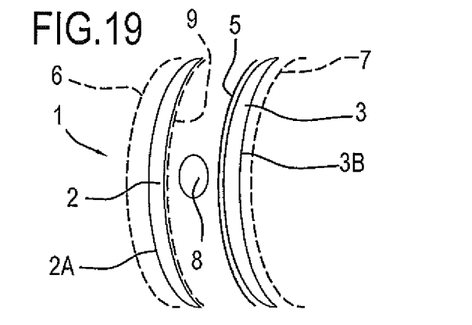
Figure 20:
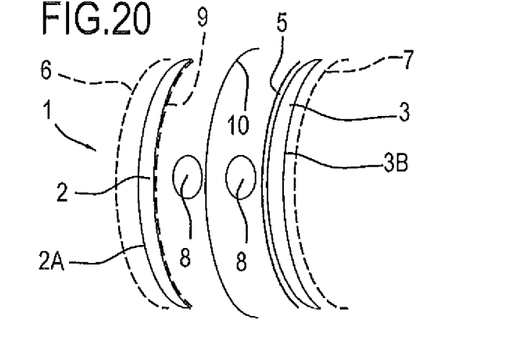

Below is a brief description of the eight variant embodiments of the lens 1, illustrated in FIGS. 13-20, with reference to these figures by way of example:

lens 1 according to the first embodiment, that is, where the coloured layer 5 is a coating of the concave surface 2B of the front glass wafer 2; this lens does not have the additional internal coating 9 and the polarized and photochromic film 10 (FIG. 13);

lens 1 according to the first embodiment, without the additional internal coating 9 and comprising the polarized and photochromic film 10 (FIG. 14);

lens 1 according to the first embodiment, comprising the additional internal coating 9 and without the polarized and photochromic film 10 (FIG. 15);

lens 1 according to the first embodiment, comprising both the additional internal coating 9 and the polarized and photochromic film 10 (FIG. 16);

lens 1 according to the second embodiment, that is, where the coloured layer 5 is a coating of the convex surface 3A of the rear glass wafer 3; this lens does not have the additional internal coating 9 and the polarized and photochromic film 10 (FIG. 17);

lens 1 according to the second embodiment, without the additional internal coating 9 and comprising the polarized and photochromic film 10 (FIG. 18);

lens 1 according to the second embodiment, comprising the additional internal coating 9 and without the polarized and photochromic film 10 (FIG. 19);

lens 1 according to the second embodiment, comprising both the additional internal coating 9 and the polarized and photochromic film 10 (FIG. 20).

In these example embodiments (described briefly above with reference to FIGS. 13-20), the lens always comprises the front coating 6 and the rear coating 7. It should be noted, however, that the lens 1 might be without the front coating 6 and/or without the rear coating 7, and that this applies to all the example embodiments listed.

The lens according to the invention has numerous advantages.

First of all, it is quick and easy to make.

Also, the colouring is durable and robust.

Also, the invention allows a wide variety of colours and colour gradients to be obtained.

The invention also makes it possible to give the lens a wide variety of optical properties or functions (in combination with the colouring and colour gradient), depending on the type of glass used (for example, the glass might be: uncoloured, coloured, with UV protection, with rare earth elements for enhanced contrast, with high impact strength), on the functional coating which may be applied (polarized and/or photochromic), on the presence of a film which may, if necessary, be interposed between the glass wafers (polarized and/or photochromic) and on external surface treatments, if any, such as for example, mirroring, anti-glare, hydrophobicity or any combination or subset of these), within the limits laid down by regulations applicable to the trade.

Another advantage of this invention compared to lenses made with the PVD method is its increased durability of the sensitive coloured surface, which is protected between two glass wafers and cannot therefore be removed by abrasion. Coatings applied by PVD, on the other hand, however resistant they may, are significantly more prone to scratching during normal use.

The invention claimed is:

1. A coloured glass lens for eyeglasses comprising a front glass wafer and a rear glass wafer having a convex surface connected to a concave surface of the front wafer, at least one of either the convex surface of the rear wafer or the concave surface of the front wafer has a coloured coating that is internal such that the coloured coating is interposed between the front glass wafer and the rear glass wafer, and wherein the lens comprises a layer of cross-linked glue interposed between said surfaces for bonding the front and rear wafers to each other, at least the layer of glue defining a filter as a screen against UV radiation such that the filter is interposed between the concave surface of the front wafer and the convex surface of the rear wafer, wherein the convex surface of the rear wafer has the coloured coating and the concave surface of the front wafer has a polarized or photochromic coating, or vice versa, and the polarized or photochromatic coating is bonded to the concave surface of the front wafer and to the convex surface of the rear wafer.

2. The lens according to claim 1, wherein the coloured coating is colour graded.

3. The lens according to claim 1, wherein the glue is a modified urethane, polyurethane, acrylic, epoxy or silicone glue.

4. The lens according to claim 1, wherein the convex surface of the rear wafer is coloured, the front wafer is without UV filters and the layer of glue defines a filter as a screen against UV rays.

5. The lens according to claim 1, wherein the concave surface of the front wafer is coloured and the front wafer defines a UV filter.

6. The lens according to claim 1, wherein the lens is free of any glued coloured polymeric layers.

7. The lens according to claim 1, comprising:
   a polarized or photochromic film interposed between the convex surface of the rear glass wafer and the concave surface of the front glass wafer;
   a first layer of glue interposed between the polarized or photochromic film and the convex surface of the rear glass wafer, and a second layer of glue interposed between the polarized or photochromic film and the concave surface of the front glass wafer.

8. The lens according to claim 1, wherein the coloured coating comprises a pigmented lacquer layer.

9. A method for making a coloured glass lens for eyeglasses, comprising a step of connecting a front glass wafer and a rear glass wafer at an interface between a convex surface of the rear wafer and a concave surface of the front wafer, further comprising the following steps:
   colouring at least one of either the convex surface of the rear wafer or the concave surface of the front wafer by applying a coloured coating on the at least one of said surfaces such that the coloured coating is interposed between the front glass wafer and the rear glass wafer or;
   applying a layer of glue at the interface, at least the layer of glue defining a filter as a screen against UV rays such that the filter is interposed between the concave surface of the front wafer and the convex surface of the rear wafer;
   bonding the rear wafer and the front wafer to each other and further including a step of cross-linking the layer of glue; and
   wherein the method further comprises the step of applying the coloured coating on the convex surface of the rear wafer and the step of applying a polarized or photochromic coating on the concave surface of the front wafer, or vice versa, wherein the polarized or photochromatic coating is bonded to the concave surface of the front wafer and to the convex surface of the rear wafer.

10. The method according to claim 9, wherein the colouring step comprises colour grading the coloured coating.

11. The method according to claim 9, wherein the colouring step comprises the following sub-steps:
   lacquering the front glass wafer or the rear glass wafer to form a coating on the concave surface of the front wafer or the convexsurface of the rear wafer, respectively;
   impregnating the coating with a liquid in which pigments are dissolved, in order to form the coloured coating.

12. The method according to claim 9, wherein the colouring is applied to the convex surface of the rear wafer, the front glass wafer being without UV filters and the layer of glue defining a UV filter, or the colouring is applied to the concave surface of the front wafer, the front glass wafer defining a UV filter.

13. The method according to claim 9, comprising a step of gluing a polarized or photochromic film between the convex surface of the rear glass wafer and the concave surface of the front glass wafer, by means of a first and a second layer of glue, respectively.

* * * * *